O. THURMANN.
APPARATUS FOR MANUFACTURING CHOCOLATE.
APPLICATION FILED FEB. 25, 1913.
1,076,924.
Patented Oct. 28, 1913.
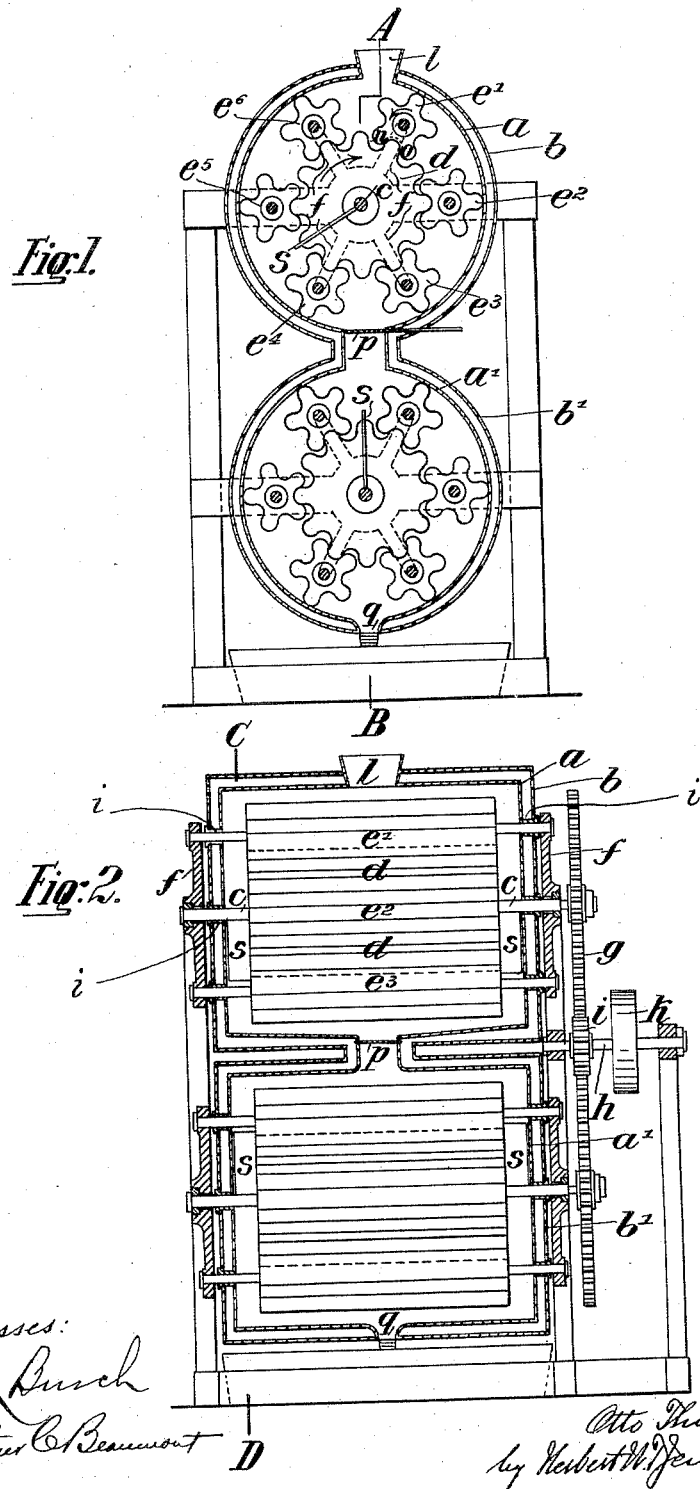

UNITED STATES PATENT OFFICE.

OTTO THURMANN, OF BERLIN, GERMANY.

APPARATUS FOR MANUFACTURING CHOCOLATE.

1,076,924.  Specification of Letters Patent.  Patented Oct. 28, 1913.

Application filed February 25, 1913. Serial No. 750,576.

*To all whom it may concern:*

Be it known that I, OTTO THURMANN, a subject of the King of Prussia, residing at Wriczenerstrasse 16/17, Berlin, N 20, Germany, have invented certain new and useful Improvements in or Relating to Apparatus for Manufacturing Chocolate; and I do hereby declare the following to be a full, clear, and exact description of the invention, such as will enable others skilled in the art to which it appertains to make and use the same.

This invention relates to a machine for the manufacture of chocolate, and it forms a combination of four machines at present used. It is a simpler construction than heretofore, and owing to the working machine parts being inclosed, it is more satisfactory from the hygienic point of view.

Hitherto, in chocolate manufacture several kinds of machines have been used, to each of which was allotted a part of the work. Cocoa grinding mills, sugar mills, mixing machines and rolling machines were employed. These four kinds of machines, the attendance upon which is very complicated, are replaced by the new mixing and grinding machine according to the present invention.

A construction according to this invention is illustrated in two views, of which—

Figure 1 is a section on line C—D of Fig. 2, and Fig. 2 a section on line A—B of Fig. 1.

The machine consists of two equal compartments, each closed in itself, the cylinder $a\ b$ and the cylinder $a'\ b'$. In the said cylinders, around a roll $d$ mounted on a spindle $c$, are arranged six smaller rolls $e'$—$e^6$ which are supported in fixed end walls $f$. The jacketed chamber $a\ b$ is provided with stuffing boxes $i$ at its ends for the end portions of the shafts of the rolls to work in. The said rolls $e'$—$e^6$ are naturally rotated in the opposite direction to that of the roll $d$. The driving of the roll $d$ is effected by a toothed wheel $g$. The latter is driven by a toothed wheel $i$ mounted on the driving spindle $h$ and transmitting the power of the motor by the pulley $k$ mounted on the same spindle $h$.

A very great advantage over the existing machines is obtained by the peculiar new shape of the rolls $d$ and $e'$—$e^6$, which are provided with semi-circular arched teeth which engage with a semi-circular hollow groove of the same size, and thus form a considerably larger rubbing or grinding surface than the known rolls of circular cross-section. The latter are in contact at the point where friction and pressure take place only along one line, while according to the present invention the whole recess is utilized for grinding or rubbing, owing to the semi-circular tooth engagement. This new shape of the rolls makes it possible to drive all the rolls by a single drive, such as by the central roll $d$. All the smaller rolls $e'$ to $e^6$ are driven by the central roll $d$, without any separate driving wheels. The rolls are surrounded by a cylindrical double casing $a\ b$ in order to be warmed and cooled as required.

The working is as follows:—The cocoa kernels, without having been first ground to a paste in a cocoa grinding mill, are introduced simultaneously with the quantity of sugar required according to the quality of the article to be produced, by means of the feed hopper $l$ or conveyer worm, into the upper cylinder $a\ b$. The toothed rolls then effect the grinding and mixing of the material. The grinding of the ingredients takes place simultaneously at the semi-circular recesses or projections $n\ o$. The material ground, owing to the proportion of fat in the cocoakernels becomes a paste at once after the first pressure at $n\ o$, and thus, at each further contact of the rolls $e^2$—$e^6$ with the main roll $d$ at the points of friction it is forced laterally farther and finally escapes at the ends of the rolls. A stripping knife $s$ is secured to each end of the central roll, and works in the space between the end of the roll and the end of the chamber. Each knife extends radially from the central shaft, and overlaps the flutes of the rolls, but does not extend far enough to strike the shafts of the small rolls. These knives scrape up the paste as it passes from between the rolls and permit it to flow into the space between the small rolls so that much of it is re-ground by the end portions of the rolls. After the mass has been ground to a sufficient degree of fineness, the sliding valve of the passage $p$ is opened, so that it passes into the second cylinder $a'$, $b'$. In the latter, the same work is continued, and then the finished homogeneous mass of chocolate passes through the outlet pipe $q$ into the receiver placed below. According to the degree of fineness required, it is possible to use only one cylinder, but three or more, in any desired position relatively to each other, can be used.

By avoiding any lubrication in the interior of the machine (the bearings of the rolls are all arranged outside the casing $a$ $b$ and the passages provided with stuffing boxes $i$) as well as by excluding contact of materials with the attendants during the process, a considerable advantage is obtained from the hygienic point of view in addition to the economic working and small loss of material.

Having now particularly described and ascertained the nature of my said invention and in what manner the same is to be performed, I declare that what I claim is:—

1. In a crushing mill, the combination, with a crushing chamber, of a fluted central driving roll arranged in the said chamber and provided with a driving shaft, fluted rolls provided with shafts and gearing into the central roll, stationary bearings for the end portions of the shafts to revolve in, and scraper knives secured at the ends of the central roll and extending outwardly from its shaft and overlapping the flutes of the rolls and working in the spaces between the ends of the rolls and the ends of the crushing chamber.

2. In a crushing mill, the combination, with a jacketed crushing chamber provided with stuffing-boxes at its ends which extend through the jacket, of a fluted central driving roll provided with a shaft which projects through two of the stuffing-boxes, fluted rolls gearing into the central roll and provided with shafts which project through the remaining stuffing-boxes, and stationary supporting bearings for all the said shafts to revolve in arranged outside the said chamber, said stuffing-boxes operating to permit fluid material to be ground without leaking out at the ends of the chamber and to prevent leak from the jacket.

In testimony whereof I affix my signature, in presence of two witnesses.

OTTO THURMANN.

Witnesses:
 WOLDEMAR HAUPT,
 HENRY HASPER.

Copies of this patent may be obtained for five cents each, by addressing the "Commissioner of Patents, Washington, D. C."